United States Patent Office 3,849,495
Patented Nov. 19, 1974

3,849,495
REDUCING PRIMARY ARYLAMINE IMPURITIES IN DIARYLAMINES
Norman Gunning Bromby, Hexagon House, Blackley, Manchester, England
No Drawing. Filed Mar. 27, 1972, Ser. No. 238,581
Int. Cl. C07c 85/16
U.S. Cl. 260—576
4 Claims

ABSTRACT OF THE DISCLOSURE

The content of primary arylamine impurities in diarylamines is reduced by heating with acids or functional derivatives of acids. The optimum effect is obtained using cyclic anhydrides of acids which form these anhydrides readily.

---

This invention relates to a process for treating diarylamines to reduce the proportion of monoarylamine impurities.

Diarylamines are of commercial value as for example antioxidants and intermediates. These diarylamines as manufactured occasionally contain as impurities small amounts of primary arylamines arising for example from their use as starting materials or as a result of side-reactions. The presence of these primary arylamines is undesirable, particularly since, if they are present in significant amounts, they may introduce a health hazard in handling of the crude diarylamine. It has now been found that by heating the crude diarylamine with certain organic acid derivatives the amount of priamry arylamine may be reduced to a level so small as may reasonably be regarded as negligible, the treated diarylamine being suitable for use for most purposes without any further treatment or purification.

According to the invention therefore there is provided a process for reducing the amount of primary arylamine impurity in a diarylamine which comprises heating the diarylamine with a functional derivative of an organic acid.

As diarylamines there are meant compounds which contain at least one nitrogen atom bearing one hydrogen atom and two aromatic radicals which may be the same or different and which may be optionally substituted. As examples of diarylamines there are mentioned diphenylamine, diphenyl-p-phenylenediamine, di - β - naphthyl-p-phenylenediamine, phenyl-β-naphthylamine and phenyl-α-naphthylamine.

As primary arylamines there are meant compounds which contain a primary amino group attached directly to an aromatic radical. As examples of such primary amines there are mentioned aniline and nuclear-substituted anilines, α- and β-naphthylamine, p-phenylenediamine, 4-aminodiphenylamine and o-, m- and p-aminodiphenyls.

As functional derivative of an organic acid there is meant a compound containing a group which will react with a primary amino group to form an amide or imide group. As examples of suitable types of functional derivative there are mentioned the acids themselves and their anhydrides, acid halides, esters, and amides. Preferred acids from which the functional derivatives are derived include alkyl, alkenyl and cycloalkyl carboxylic acids and particularly aromatic carboxylic acids and dicarboxylic acids and polycarboxylic acids which readily form cyclic anhydrides. As examples of specific functional derivatives of such preferred organic acids there are mentioned phthalic anhydride, benzoic anhydride, succinic anhydride, glutaric anhydride and phthaloyl chloride. The anhydrides are generally more effective than the acids themselves.

Among other acids and functional derivatives of these which may be used there may be mentioned functional derivatives of carbamic acids, such as carbamyl chloride and isocyanates, acidic phenols and their acid chlorides, functional derivatives of cyanuric acid and other similar acidic heterocylic compounds such as cyanuric chloride, mono and dichlorotriazines, and cyanuric esters, esters of organic sulphonic acids and esters of organic phosphorus-containing acids.

The functional derivative of the organic acid may be expected to be capable of converting a molar equivalent amount of primary arylamine into a non-objectionable derivative. In practice however it is desirable to use the derivative in excess of the molar amount of primary amine. In general the greater the excess of acid derivative the more the removal of primary arylamine, but too great an excess may of course affect the suitability of the treated diarylamine for its proposed use. A diarylamine containing 250 p.p.m. of primary monoamine would suitably be treated with 0.25–1% by weight of a functional derivative such as phthalic anhydride, but if very low levels of primary amine are desired it may be necessary to use greater amounts, for example up to 5%, of the acid derivative.

The process may be carried out at any convenient temperature at which reaction with the primary arylamine is sufficiently fast, this depending in part on the primary arylamine and functional derivatives of an acid concerned. The diarylamine is preferably in liquid form during the treatment, and in particular in molten form which will normally require a temperature not less than about 100° C., although in appropriate cases lower temperatures may be used. It is not usually necessary to use a temperature higher than 300° C., but higher temperatures may be used if desired. The treatment may however if desired be carried out in solution or suspension in solvents inert to the amine and to the functional derivative of the organic acid.

After treatment the diarylamine may be purified by any desired method if necessary, but for many purposes the treated diarylamine may be used without further purification.

The invention is illustrated but not limited by the following Examples in which all parts and percentages are by weight.

Example 1

Phenyl-β-naphthylamine containing 20 p.p.m. of β-naphthylamine and 500 p.p.m. of aniline is heated with 5% by weight of phthalic anhydride at 250° C. for fifteen minutes. The crude product contains 0.1–0.2 p.p.m. of β-naphthylamine and 10–20 p.p.m. of aniline as determined by gas-liquid chromatography.

Example 2

Phenyl-β-naphthylamine containing β-naphthylamine is heated with an acid or functional derivative thereof at 250° C. for 15 minutes and the residual β-naphthylamine content determined by gas-liquid chromatography. Table 1 lists the acids or functional derivative used and its amount, and the β-naphthylamine content before and after treatment.

TABLE 1

| Additive and usage | Percent | β-Naphthylamine content in p.p.m. | |
|---|---|---|---|
| | | Before treatment | After treatment |
| Phthalic anhydride | 3 | 100 | 0.2 |
| Glutaric anhydride | 2 | 185 | 0.1 |
| Succinic anhydride | 2 | 185 | 0.2 |
| Benzoic anhydride | 2 | 185 | 0.2 |
| Succinic acid | 2 | 185 | 0.6 |
| 1:6:3 mixture of adipic, glutaric and succinic acids | 2 | 185 | 1.2 |
| N,N'-bis chlorocarbonyl-4-N-(isopropylamino)diphenylamine | 3 | 185 | 1.8 |

TABLE 1—Continued

| Additive and usage | Percent | β-Naphthylamine content in p.p.m. | |
|---|---|---|---|
| | | Before treatment | After treatment |
| m-Tolylene diisocyanate dimer | 2 | 185 | 2.4 |
| Pyromellitic dianhydride | 2 | 185 | 7.5 |
| Picric acid | 2 | 185 | 11.8 |
| Bis(isocyanatephenyl)methane | 2 | 185 | 14.6 |
| Piperidine carbonyl chloride | 2 | 185 | 15.2 |
| Cyanuric chloride | 2 | 185 | 22.3 |
| 2,4-diamino-6-chloro-s-triazine | 2 | 185 | 25.8 |
| Maleic anhydride | 2 | 185 | 27 |
| β-Naphthyl urethane of bis(isocyanatophenyl)methane | 2 | 185 | 27.3 |
| Phthalic acid | 2 | 185 | 33.5 |
| Glutanic acid | 2 | 185 | 34.1 |
| Oxalic acid | 2 | 185 | 36.0 |
| Propiolactone | 2 | 185 | 44.0 |
| Methyl p-toluene sulphonate | 2 | 185 | 46.0 |
| Dimethyl phthalate | 5 | 30.1 | 11.5 |
| Oleyl chloride | 5 | 30.1 | 7.52 |
| Formamide | 5 | 30.1 | 8.5 |
| 2,,6-tri(o-chlorophenoxy)-s-triazine | 5 | 30.1 | 1.6 |
| Tris-nonylphenyl phosphite | 5 | 30.1 | 17.8 |
| Diethyl dithiophosphoric acid | 5 | 41.6 | 9.8 |
| Methyl salicylate | 5 | 41.6 | 11.7 |
| Phthaloyl chloride | 5 | 41.6 | <0.1 |
| Terephthaloyl chloride | 5 | 41.6 | 1.2 |
| 2,4-dichloro-6-ethoxytriazine | 5 | 41.6 | 0.4 |
| 2-chloro-4,6-dimethoxytriazine | 5 | 41.6 | 0.4 |
| 2,4,6-trimethoxy-s-triazine | 5 | 41.6 | 4.9 |

Example 3

Phenyl - α - naphthylamine containing 41.4 p.p.m. of aniline and 85.7 p.p.m. of α-naphthylamine is heated with 1% of phthalic anhydride at 250° C. under nitrogen and allowed to cool under nitrogen. The product, analysed by gas-liquid chromatography contained 6.4 p.p.m. of aniline and 9 p.p.m. of α-naphthylamine.

Example 4

4 - N - (isopropylamino)diphenylamine containing 3194 p.p.m. of 4-aminodiphenylamine is heated with 3% of phthalic anhydride by the procedure described in Example 3. The product contained 337 p.p.m. of 4-aminodiphenylamine.

Example 5

The procedure of Example 4 is repeated using 5% of phthalic anhydride and 4 - N - (1,3-dimethylbutylamino)diphenylamine containing 6812 p.p.m. of 4-aminodiphenylamine. The product contained 558 p.p.m. of 4-aminodiphenylamine.

Example 6

The procedure of Example 4 is repeated using 3% of phthalic anhydride and N,N'-diphenyl-p-phenylenediamine containing 407 p.p.m. of aniline. The product contained 8.9 p.p.m. of aniline.

Example 7

The procedure of Example 5 is repeated at a temperature of 55° C. for 24 hours. The product contained 1499 p.p.m. of 4-aminodiphenylamine.

Example 8

20 Parts of 4-N-(isopropylamino)diphenylamine containing 1.14% of 4-aminodiphenylamine is stirred with 1 part of phthalic acid and 40 parts of boiling water for 1 hour. The product contained 0.66% of 4-aminodiphenylamine. A similar procedure using phthalic anhydride gave a product containing 0.26% of 4-aminodiphenylamine.

Example 9

The procedure of Example 7 is repeated using phenyl-β-naphthylamine containing 41.6 p.p.m. of β-naphthylamine. The product contained 8.8 p.p.m. of β-naphthylamine. A similar result was obtained using phthalic anhydride.

What is claimed is:

1. A process for reducing, in a diarylamine selected from the group consisting of diphenylamine, diphenyl-p-phenylenediamine, di-β-naphthyl - p - phenylenediamine, phenyl-β-naphthylamine and phenyl-α-naphthylamine, the amount of corresponding primary arylamine present therein as an impurity, said process consisting essentially of heating said diarylamine with a member selected from the group consisting of phthalic acid, glutaric acid, succinic acid and a 1:6:3 mixture of adipic, glutaric and succinic acids, and anhydrides of said acids in amounts of 0.25 to 5.0 percent of the weight of said diarylamine so as to react with a major amount of said primary arylamine.

2. The process of claim 1 wherein said diarylamine is phenyl-α-naphthylamine and said primary arylamine is α-naphthylamine.

3. The process of claim 1 wherein said diarylamine is phenyl-β-naphthylamine and said corresponding primary arylamine is β-naphthylamine.

4. The process of claim 1 wherein said diarylamine is di-β-naphthyl-p-phenylenediamine and said primary arylamine is β-naphthylamine.

References Cited

UNITED STATES PATENTS 3,072,662   1/1963   Murray, Jr. et al. ___ 260—582 X
3,452,096   6/1969   Paleveda, Jr. et al. ____ 260—582

OTHER REFERENCES

Millar et al., "Sidgwick's Organic Chemistry of Nitrogen," 3rd Edition, page 160 (1966).

Migrdichian, "Organic Synthesis," Vol. 2, page 1432 (1957).

Houben-Weyl, "Methoden Der Organischem Chemie," Vol. 11/1, pages 1029–1933 (1957).

ROBERT V. HINES, Primary Examiner

S. P. WILLIAMS, Assistant Examiner

U.S. Cl. X.R.

260—248 (C), 281, 293.79, 325, 326 (R), 453 AM, 562 (R), 567.5, 582